United States Patent [19]

Holcomb et al.

[11] Patent Number: 4,991,225
[45] Date of Patent: Feb. 5, 1991

[54] SLIDABLE BATTERY HOLDER FOR SIMULATED PAGER WITH CONCEALED RADIO TRANSMITTER

[75] Inventors: Jack N. Holcomb, 1400 NW. 62nd St., Fort Lauderdale, Fla. 33307; Konrad K. Pangratz, Fort Lauderdale; James E. Jesse, Pompano Beach, both of Fla.

[73] Assignee: Jack N. Holcomb, Pompano Beach, Fla.

[21] Appl. No.: 438,246

[22] Filed: Nov. 20, 1989

[51] Int. Cl.$^5$ .................. H04B 1/38; H04B 1/08
[52] U.S. Cl. .................. 455/90; 455/343; 455/347; 429/100
[58] Field of Search .................. 455/89, 90, 127, 128, 455/343, 344, 348, 349, 351; 361/392, 395, 399; 320/2; 429/96, 97, 99, 100

[56] References Cited

U.S. PATENT DOCUMENTS

| 3,077,563 | 2/1963 | Combs et al. | 307/150 |
| 4,002,892 | 1/1977 | Zielinski | 307/150 |
| 4,146,682 | 3/1979 | Wakao | 429/100 |
| 4,641,370 | 2/1987 | Oyamaeda | 455/348 |
| 4,648,125 | 3/1987 | Brown | 458/349 |
| 4,653,115 | 3/1987 | Holcomb | 455/348 |
| 4,786,889 | 11/1988 | Hayasaka | 455/90 |

Primary Examiner—Reinhard J. Eisenzopf
Assistant Examiner—Lisa Charouel
Attorney, Agent, or Firm—Oltman & Flynn

[57] ABSTRACT

This is a slidable battery holder for a simulated pager having a concealed radio transmitter. A fixed part of the battery holder is affixed to a bracket inside the housing of the simulated pager and provides a guideway which is open at the lower end of the housing. A pair of cantilevered leaf spring contacts are at the upper end of this guideway. The slidable part of the battery holder has a dielectric slide that is slidably received in the guideway, conductors on one face of the slide which engage the cantilevered switch contacts when the slide is pushed in, and battery contacts beyond the opposite face of the slide for engagement by the terminals of a battery. The battery contacts are connected conductively by their bias springs to the conductors on the slide.

13 Claims, 3 Drawing Sheets

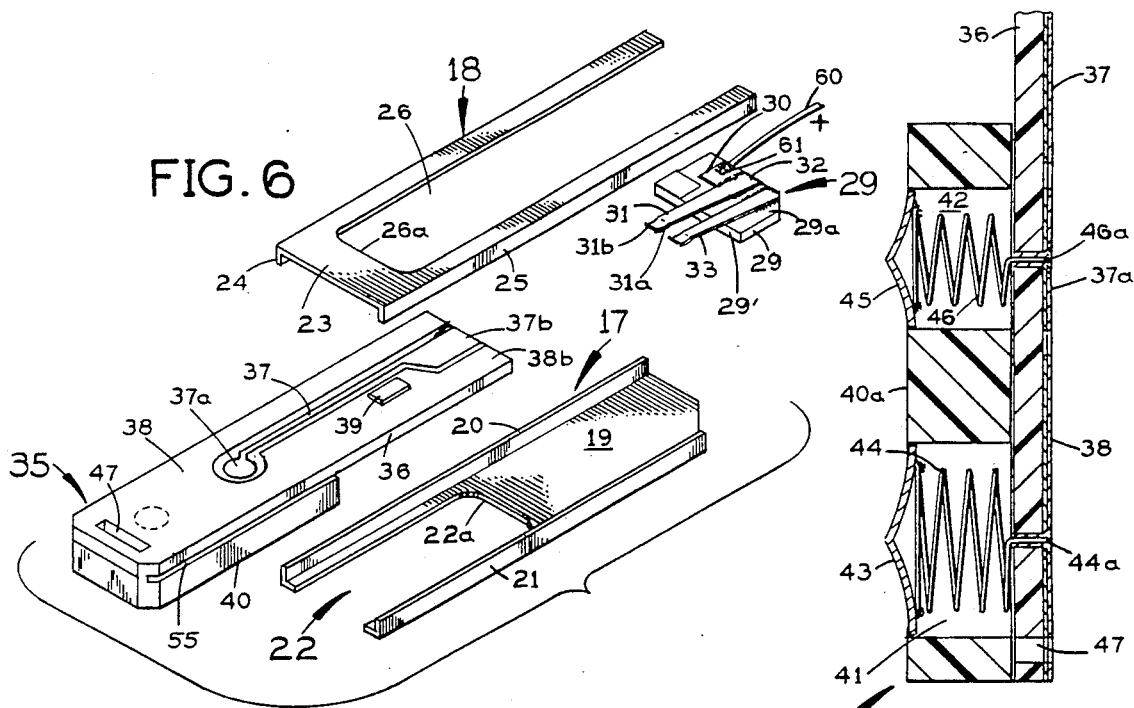
FIG. 6
FIG. 7
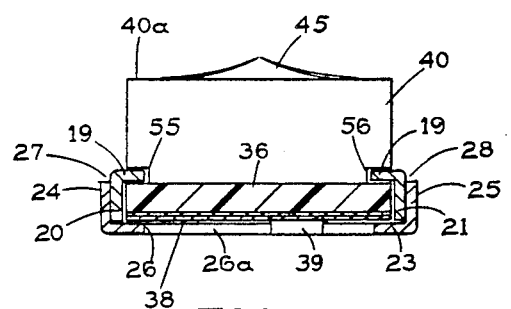
FIG. 8
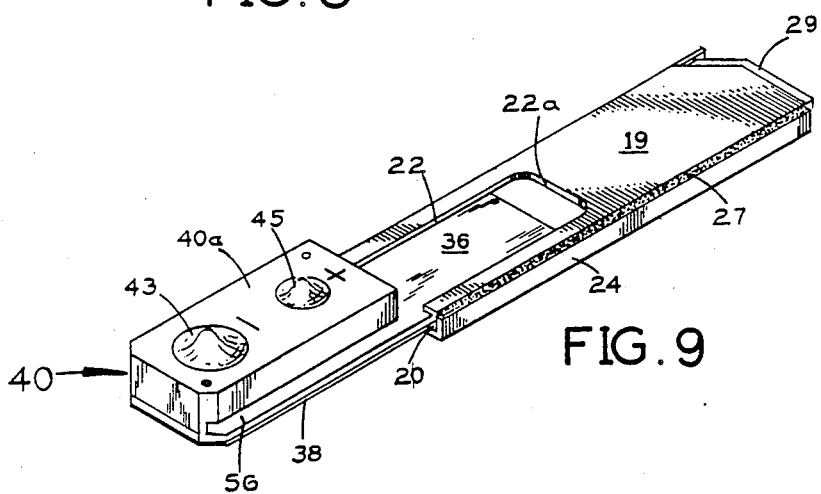
FIG. 9

4,991,225

SLIDABLE BATTERY HOLDER FOR SIMULATED PAGER WITH CONCEALED RADIO TRANSMITTER

BACKGROUND OF THE INVENTION

Prior to the present invention, applicant's assignee has manufactured and sold a simulated pager with a concealed radio transmitter for use by law enforcement authorities. The transmitter is turned on to broadcast a conversation with a criminal suspect to a radio receiver at a different location where a sound recording is made of the conversation. The simulated pager is an effective "cover" for the concealed transmitter because it is unlikely to arouse the suspicion of the person under surveillance. The simulated pager has circuit components which produce a visible display that is indistinguishable from that of an actual pager of known design but it does not actually operate as a pager.

Difficulties have been encountered with that simulated pager when customers insert or remove its battery. In some instances the connection from the battery to the simulated pager circuitry and to the concealed transmitter has been broken due to customer error. Also, there was the possibility that the customer could put the battery in with the polarity reversed from the correct arrangement.

SUMMARY OF THE INVENTION

The present invention relates to a sliding battery holder for a simulated pager with a concealed radio transmitter used in monitoring of a criminal suspect.

A principal object of this invention is to provide such a holder which facilitates the insertion and removal of a battery for the simulated pager and its concealed transmitter and minimizes the chance of damage.

Further objects and advantages of this invention will be apparent from the following description of a presently preferred embodiment shown in the accompanying drawings.

Preferably, the slidably battery holder has a fixed part that is attached to a support bracket for the circuit components of the simulated pager and the transmitter inside the pager housing and a slidable part that carries battery contacts to which the terminals of a battery can be connected. The fixed part of the battery holder defines a guideway which is open at its lower end and supports two cantilevered leaf spring switch contacts at the upper end of the guideway, one of which is connected to the circuits of the simulated pager and the transmitter and the other of which is grounded to the support bracket. The slidable part of the battery holder has a dielectric slide which is slidably received in the guideway of the fixed part and is slidable between an extended position partway out of the housing and a retracted position completely inside the housing. Conductors on one face of the slide engage the switch contacts on the fixed part of the battery holder when the slide is slid in to its retracted position and are spaced from these contacts when the slide is slid out to its extended position. The battery contacts on the slidable part are positioned beyond the opposite face of the slide and are connected conductively to the conductors for supplying battery power to the switch contacts on the fixed part of the battery holder when the slide is in its retracted position.

DESCRIPTION OF THE DRAWINGS

FIG. 6 is an exploded perspective view of the slidable battery holder in accordance with the present invention;

FIG. 7 is a fragmentary vertical section taken along the line 7—7 in FIG. 3 through the contacts on the slidable part of the battery holder for engaging the battery terminals;

FIG. 8 is a cross-section taken along the line 8—8 in FIG. 5;

FIG. 9 is a perspective view of the battery holder in its pulled-out position;

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Figure 1:
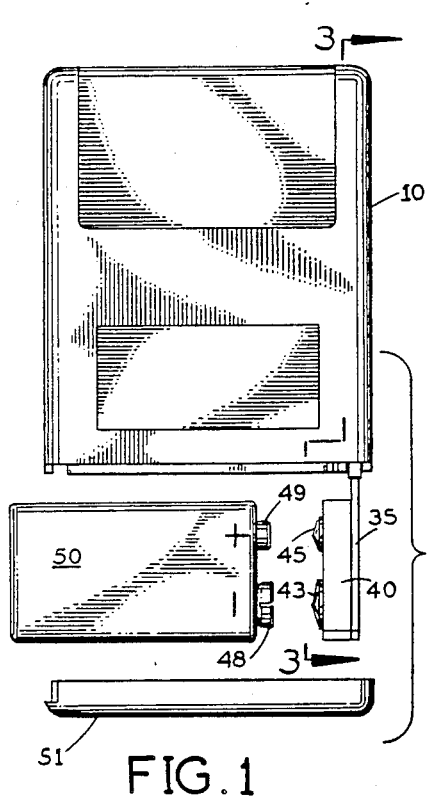
FIG. 1 is exploded front elevation of the housing for the simulated pager and the concealed radio transmitter, the battery holder pulled out from this housing, the battery, and the bottom end cap for the housing.
Figure 2:
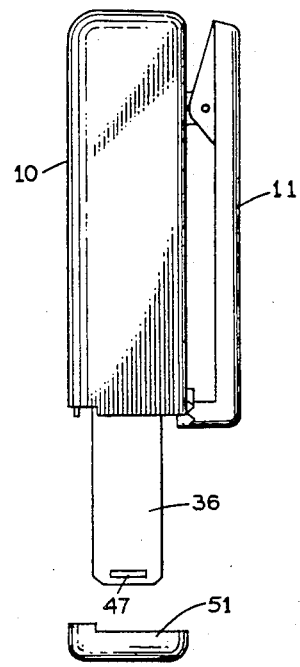
FIG. 2 is an end elevation taken from the right end in FIG. 1.
Figure 3:
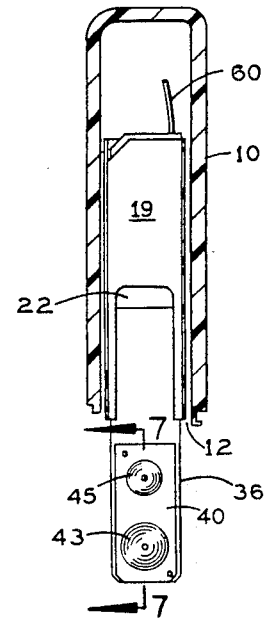
FIG. 3 is a cross-section taken along the line 3—3 in FIG. 1.

Referring to FIGS. 1–3, a generally rectangular housing 10 holds a simulated pocket pager of known design and a radio transmitter. A spring clip 11 (FIG. 2) of known design is pivotally mounted on the back of housing 10 for releasably attaching it to a person's shirt pocket or belt, for example. As shown in FIG. 3, the housing 10 is closed at the top and open at the bottom, where it has opening 12 between its opposite sides and its opposite ends.

Figure 4:
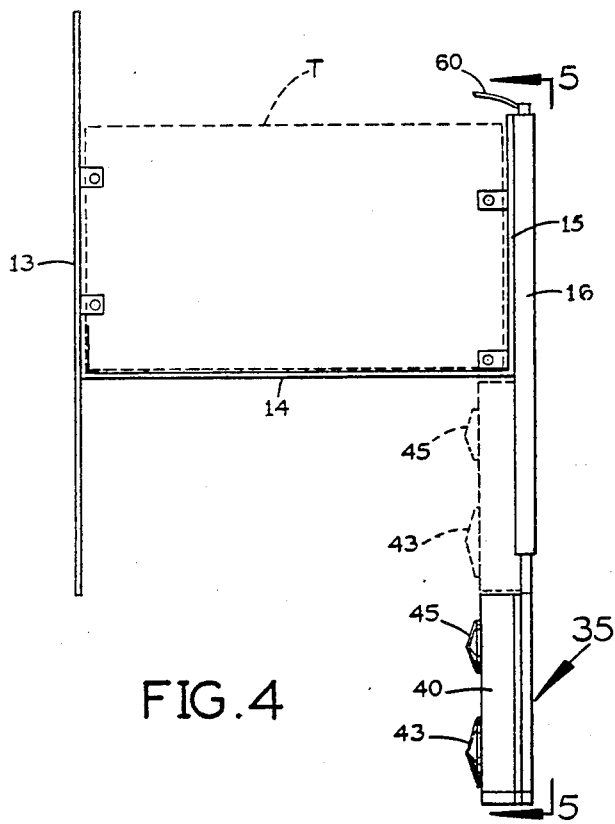
FIG. 4 is a front elevation showing the holder for the printed circuit board of the simulated pager and the slidable battery holder, which is shown in full lines in its pulled-out position and in phantom in its pushed-in position.

Referring to FIG. 4, inside the housing 10 is a rigid bracket or frame which supports a printed circuit board carrying the components of the simulated pager and two back-to-back circuit boards carrying the components of the transmitter and the antenna of the transmitter. This bracket includes an elongated side piece 13 which extends along the inside of the left side of housing 10 in FIG. 1, a bottom segment 14 joined to side piece 13 part-way down and extending perpendicularly from it, and a right side segment 15 formed integral with the bottom segment 14 and extending perpendicularly up from it close to the inside of the right side of housing 10 in FIG. 1. The longer side piece 13 of the bracket is of dielectric material and a metal foil antenna for the radio transmitter is bonded to its outer face. The circuit boards of the radio transmitter are supported by bracket 13, 14, 15 as indicated in phantom at T in FIG. 4. Also, the circuit board for the simulated pager is supported by bracket 13, 14, 15. The bottom and right side piece 14, 15 of the bracket is of metal and provides a ground for the simulated pager circuit and also for the radio transmitter T.

As shown in FIG. 4, a fixed part 16 of the present battery holder is soldered to the laterally outward face of the right side piece 15 of bracket 13, 14, 15 in the pager housing. Referring to FIG. 6, the fixed part 16 of the battery holder comprises a slotted inner channel piece 17 and a slotted outer channel piece 18 rigidly attached to inner piece 17 and forming with it a guideway of rectangular cross-section for slidably receiving the sliding part of the battery holder. Both channel pieces 17 and 18 are of metal and they are grounded to the frame pieces 14, 15.

The inner channel piece 17 has a flat end wall 19 that extends contiguous to the outside of the bracket side piece 15 and narrow side flanges 20 and 21 that extend perpendicular to end wall 19 along its entire length. The end wall 19 has a wide rectangular slot 22 that is open at its bottom edge and extends up about half-way up the inner channel piece 17. The top edge of slot 22 is designated 22a.

The outer channel piece 18 has a flat end wall 23 and narrow opposite side flanges 24 and 25 extending perpendicular to end wall 23 and fitting snugly outside the corresponding flanges 20 and 21 on the inner channel piece 17, as shown in FIG. 8. End wall 23 is formed with a wide rectangular slot 26 that is open at its top edge and extends down almost the entire length of the outer channel piece 18. The bottom edge of slot 26 is designated 26a. The inner piece 17 and the outer piece 18 of the fixed part of the battery holder are soldered to each other along their contiguous side flanges 20, 24 and 21, 25, as shown at 27 and 28 in FIG. 8.

Figure 11:
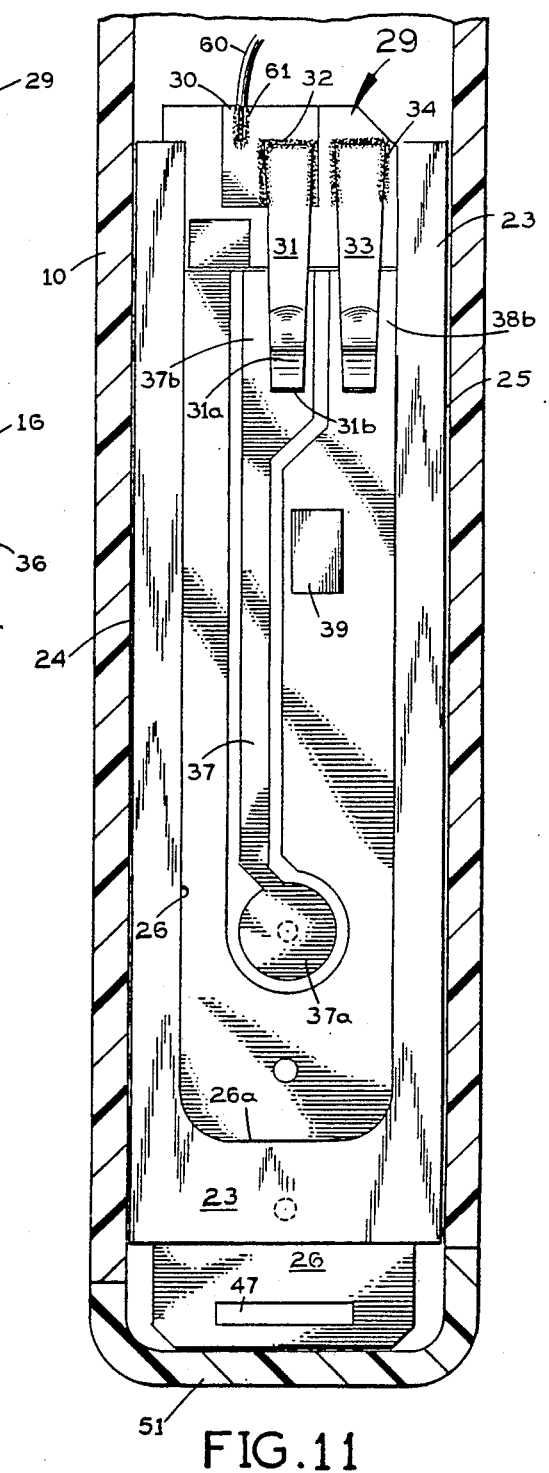
FIG. 11 is a vertical cross-section taken along the line 11—11 in FIG. 10.

A block 29 of dielectric material (FIGS. 6 and 11) is snugly received in the upper end of the guideway between the inner piece 17 and the outer piece 18 of the fixed part 16 of the battery holder. A thin two-ply foil element 30 with copper on the inside and nickel silver on the outside is bonded to the major face 29a of block 29 that is away from the end wall 19 of inner piece 17. A first cantilevered leaf spring switch contact member 31 of electrically conductive metal is soldered at 32 to foil element 30 and extends in cantilever fashion beyond the bottom edge 29' of dielectric block 29 toward the slotted end of the inner piece 17, presenting a rounded segment 31a that is offset toward wall 19 of inner piece 17 and terminating in a lip 31b on its free lower end that is inclined away from wall 19. A second cantilevered leaf spring switch contact 33 of the same shape is soldered at 34 on the same face of dielectric block 29 and to the wall 23 of outer piece 18 on one side of its slot 26, as best seen in FIG. 11. Switch contact 33 extends in cantilever fashion beyond the bottom edge 29' of block 29 closely parallel to the first switch contact member 31.

An insulated electrical wire 60 is soldered to the foil element 30 at 61 in FIGS. 6 and 11. This wire extends to the radio transmitter and the simulated pager circuitry to provide the battery positive potential to them.

The slidable part 35 of the battery holder includes a thin rectangular slide 36 of suitable dielectric material which is slidably received in the guideway between the inner and outer pieces 17 and 18 of the fixed part 16 of the battery holder, as shown in FIGS. 8 and 9.

A narrow, elongated first electrically conductive layer 37 (FIGS. 6 and 11) is deposited on one major face of slide 36, which is on the laterally outboard side of the slidable part 35 (FIG. 1). Layer 37 has a circular enlargement 37a at its lower end and a rectangular enlargement 37b at its upper end which engages the offset rounded segment 31a of the first switch contact member 31 when the slidable part 35 of the battery holder is pushed all the way into the fixed part 16 of the battery holder, as shown in FIG. 11.

A bifurcated second electrically conductive layer 38 is deposited on most of the remainder of the same major face of slide 36 and it extends on opposite sides of the narrow first conductive layer 37. The two conductive layers 37 and 38 are slightly spaced apart throughout the entire extent of the narrow first layer 37, so they are electrically separate from each other. At its upper end the bifurcated second layer 38 presents a rectangular segment 38b which engages the rounded segment of the second switch contact member 33 when the slidable part 35 of the battery holder is pushed all the way into the fixed part 16 of the battery holder.

As shown in FIG. 7, each conductive layer 37 and 38 on slide 36 is of two-ply configuration, with a copper ply on the inside engaging the dielectric slide 36 and an nickle silver ply on the outside.

Figure 5:
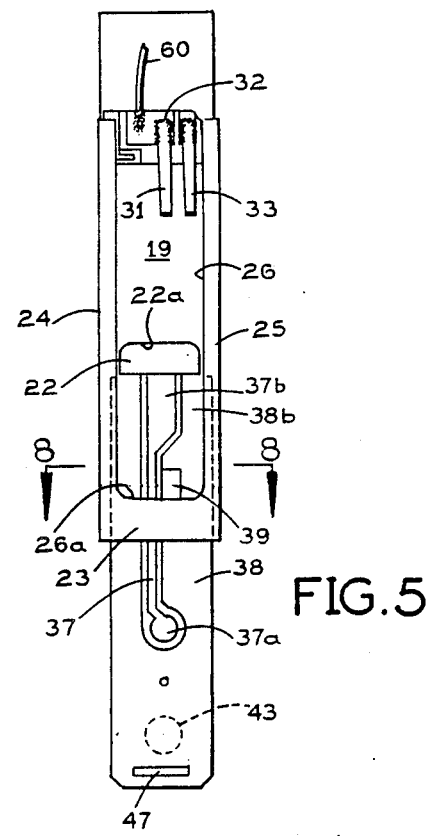
FIG. 5 is an end elevation taken from the line 5—5 in FIG. 4.

A stop member 39 (FIGS. 6, 8 and 11) is soldered or otherwise affixed to the second electrically conductive layer 38 on slide 36. This stop member is engageable with the bottom edge 26a of slot 26 in the outer piece 18 of the fixed part 16 of the battery holder when the slide 36 is pulled out (FIG. 5) thereby preventing the complete removal of the slide 36 from the fixed part 16 of the battery holder.

A rigid dielectic block 40 (FIGS. 6 and 9) is adhesively attached to the opposite major face of slide 36, covering approximately the lower half of the slide. As best seen in FIG. 7, this block is formed with a cylindrical lower opening 41 and a cylindrical upper opening 42 of smaller diameter. Block 40 has a longitudinal recesses 55 and 56 (FIGS. 6, 8 and 9) in its opposite sides next to the slide 36. When the slidable part 35 of the battery holder is slid into the fixed part 16, these recesses slidably receive the segments of end wall 19 of the inner piece 17 of the fixed part which are located on opposite sides of its slot 22.

A flared, centrally-pointed battery contact disk 43 of electrically conductive metal covers the lower opening 41 and is slidable into that opening. A coil spring 44 of electrically conductive metal in the lower opening 41 is soldered at one end of the back of contact disk 43. At the opposite end of the opening 41, the coil spring 44 engages the slide 36 and it terminates in a straight segment 44a that passes through a small hole in slide 36 and engages the second conductive layer 38 on the opposite face of the slide, thereby connecting the battery contact disk 43 conductively to the conductive layer 38. Normally spring 44 positions the lower battery contact disk 43 as shown in FIG. 7, with its central tip projecting slightly beyond the adjacent face 40a of block 40.

A flared, centrally pointed battery contact disk 45 of electrically conductive metal covers the upper opening 42 and is slidable into that opening. A coil spring 46 of electrically conductive metal in the upper opening is soldered at one end to the back of contact 45. At the opposite end of opening 42, the coil spring 46 engages the slide 26 and it terminates in a straight segment 46a that passes through a small hole in slide 36 and engages the rounded segment 37a on the lower end of the first conductive layer 37 on the opposite face of the slide, thereby connecting the upper battery contact disk 45 conductively to the conductive layer 37. Normally, spring 46 positions the upper battery contact 45 as shown in FIG. 7, with its central tip projecting slightly beyond the adjacent face 40a of block 40.

The slide 36 has a wide recess or depression 47 (FIGS. 5, 6 and 7) near its lower end for receiving a person's finger nail when the slide is to be pulled out. This recess is in the laterally outboard side of the slidable part 35 of the battery holder in FIG. 1.

Figure 10:
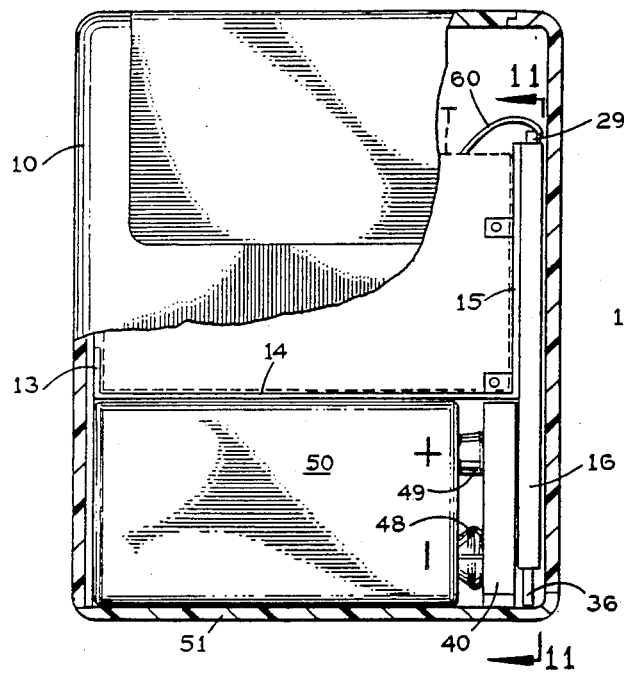
FIG. 10 is a view of the simulated pager with the battery holder pushed in and the bottom end cap attached, showing the pager partly in front elevation and partly with the front of the pager housing broken away.

When the slide 35 is pushed all the way into the fixed part 16 of the battery holder, as shown in FIG. 11, its narrow first conductive layer 37 engages the first switch contact 31, thereby conductively connecting the upper battery contact 45 to switch contact 31 and from there through foil element 30 and wire 60 to the radio transmitter and the simulated pager inside the housing 10, and its bifurcated second conductive layer 38 engages the second switch contact 33, thereby conductively connecting the lower battery contact 43 to switch contact 33 (which is grounded to the fixed part 16 of the battery holder). The battery contacts 43 and 45 on slide 36 are shaped and dimensioned to be engaged respectively by the negative terminal 48 (FIG. 1) and the smaller positive terminal 49 of a conventional 9 volt aklaline battery 50, as shown in FIG. 10. This can be done when the slide 36 is pulled out, as shown in FIG. 1. Then the slide 36 and battery 50 can be pushed in to the position shown in FIG. 11, where the bottom of the pager casing 10 can be closed by an end cap 51 (FIG. 1) of known design.

With this arrangement, the battery cannot be connected to the simulated pager and the radio transmitter with the wrong polarity. The battery can be easily installed or removed when the slidable part 35 of the battery holder is pulled out, and in this position the battery is not connected electrically to the pager circuitry or the radio transmitter. It is only after the battery has been properly connected to the sliding part 35 of the battery holder and that part has been pushed in that contact is made with the cantilevered spring contacts 31 and 33 to connect the battery to the simulated pager circuitry and the radio transmitter.

We claim:

1. A slidable battery holder in a simulated pager, said simulated pager having a housing with an open end, a detachable end cap for closing said open end of the housing, the circuit components of a simulated pager in said housing, a radio transmitter in said housing, and a bracket in said housing supporting said simulated pager components and said transmitter;

said battery holder comprising:
   a fixed part attached to said bracket and extending toward said open end of the housing, said fixed part of the battery holder presenting a guideway which has an open end facing toward said open end of the housing and which extends from said open end along said fixed part into said housing:

first and second electrically separate switch contacts mounted on said fixed part of the battery holder adjacent said guideway away from said open end of said guideway;

and a slidable part comprising a slide of dielectric material slidable along said guideway, first and second conductive strips on said slide positioned respectively to engage said first and second switch contacts when said slide is slid along said guideway into said housing and to be spaced from said switch contacts when said slide is slid along said guideway out of said housing, and first and second battery contacts on said slide connected respectively to said first and second conductive strips, said battery contacts being shaped and dimensioned to engage the corresponding terminals of a battery;

said guideway being in said fixed part and having a substantially rectangular cross-section;

said slide being a dielectric body of substantially rectangular cross-section slidably received in said guideway and having opposite first and second major faces;

said conductive strips being on said first major face of said slide;

and said battery contacts being exposed beyond said second major face of said slide in the direction away from said first major face.

2. A battery holder according to claim 1 wherein said slidable part of the battery holder comprises further:
   a dielectric block attached to said slide on said second major face of the slide, said block having first and second openings therethrough extending to said second major face of the slide;

said first and second battery contacts being slidable respectively in said openings;

and first and second springs of electrically conductive material in said openings biasing said battery contacts to project slightly beyond said block away from slide, said first and second springs at one end thereof extending through said slide between its opposite major faces and making contact respectively with said first and second conductive strips.

3. A battery holder according to claim 2 wherein:
   said switch contacts are cantilevered spring contacts having their respective free ends toward said open end of said guideway.

4. A battery holder according to claim 1, wherein:
   said switch contacts are cantilevered spring contacts having their respective free ends toward said open end of said guideway.

5. A slidable battery holder in a simulated pager, said simulated pager having a housing with an open end, a detachable end cap for closing said open end of the housing, the circuit components of a simulated pager in said housing, a radio transmitter in said housing, and a bracket in said housing supporting said simulated pager components and said transmitter;

said battery holder comprising:
   a fixed part attached to said bracket and extending toward said open end of the housing, said fixed part of the battery holder presenting a guideway which has an open end facing toward said open end of the housing and which extends from said open end along said fixed part into said housing:

first and second electrically separate switch contacts mounted on said fixed part of the battery holder along said guideway away from said open end of said guideway;

and a slidable part comprising a slide of dielectric material slidable along said guideway and having opposite first and second major faces, first and second conductive strips on said first major face of said slide and positioned respectively to engage said first and second switch contacts when said slide is slid along said guideway into said housing and to be spaced from said switch contacts when said slide is slid along said guideway out of said housing, and first and second battery contacts on said slide connected respectively to said first and second conductive strips, said battery contacts being shaped and dimensioned to engage the corresponding terminals of a battery;

said slidable part of the battery holder comprising further:
- a dielectric block attached to said slide on said second major face of the slide, said block having first and second openings therethrough extending to said second major face of the slide;
- said first and second battery contacts being slidable respectively in said openings;
- and first and second springs of electrically conductive material in said openings biasing said battery contacts to project slightly beyond said block away from said slide, said first and second springs at one end thereof extending through said slide between its opposite major faces and making contact respectively with said first and second conductive strips.

6. A slidable battery holder in a simulated pager, said simulated pager having a housing with an open end and opposite sides, a detachable end cap for closing said open end of the housing, a simulated pager circuit board in said housing, and a radio transmitter in said housing, said battery holder comprising:
- a fixed part mounted in said housing and extending along the inside of one of said opposite sides toward said open end of the housing:
- first and second electrically separate switch contacts on said fixed part of the battery holder in said housing away from said open end of the housing;
- and a slidable part slidably engaging said fixed part for selective adjustment along said fixed part between a retracted position completely inside said housing and an extended position projecting partly outside said housing beyond said open end of the housing, said slidable part having first and second battery contacts thereon which face laterally into said housing away from said one side of the housing in said retracted position of said slidable part and are outside said housing beyond said open end when said slidable part is in said extended position, and said slidable part having first and second conductors thereon respectively connected conductively to said first and second battery contacts and extending therefrom into said housing toward said first and second switch contacts, respectively, said first and second conductors respectively engaging said first and second switch contacts in said retracted position of said slidable part and being separated from said first and second switch contacts in said extended position of said slidable part.

7. A slidable battery holder according to claim 6 wherein:
said switch contacts are cantilevered leaf spring contacts having their respective free ends toward said open end of the pager housing.

8. A slidable battery holder according to claim 6 wherein:
said battery contacts are spring-mounted on said slidable part of the battery holder.

9. A battery holder according to claim 6 and further comprising:
stop means acting between said slidable part and said fixed part of the battery holder in said extended position of said slidable part to maintain said slidable part slidably engaging said fixed part and prevent them from completely separating.

10. A slidable battery holder in a simulated pager, said simulated pager having a generally rectangular housing with an open end and opposite sides, a detachable end cap for closing said open end of the housing, the circuit components of a simulated pager in said housing, a radio transmitter in said housing, and a bracket in said housing supporting said simulated pager components and said transmitter;

said battery holder comprising:
- a fixed part attached to said bracket and extending along the inside of said housing next to one of said opposite sides toward said open end of the housing, said fixed part of the battery holder presenting a guideway which has an open end facing toward said open end of the housing and which extends along said fixed part into said housing:
- first and second electrically separate switch contacts mounted on said fixed part of the battery holder along said guideway away from said open end of said guideway, said switch contacts being exposed on the laterally inward side of said fixed part away from said one side of the housing;
- and a slidable part comprising a slide of dielectric material slidable along said guideway and having a laterally outboard face and a laterally inboard face, first and second conductive strips on said laterally outboard face of said slide positioned respectively to engage said first and second switch contacts when said slide is slid along said guideway into said housing and to be spaced from said switch contacts when said slide is slid along said guideway out of said housing, and first and second battery contacts located laterally inward from said laterally inboard face of said slide and respectively connected conductively to said first and second conductive strips, said battery contacts being shaped and dimensioned to engage the corresponding terminals of a battery on the laterally inboard side of said slide.

11. A battery holder according to claim 10 wherein:
said slide is a thin dielectric body slidably received in said guideway;
said slidable part of the battery holder further comprises a dielectric block on said laterally inboard face of said slide, said block having first and second openings therethrough extending to said laterally inboard face of said slide;
said first and second battery contacts are slidable respectively in said openings;
and further comprising:
first and second springs of electrically conductive material in said openings biasing said battery contacts to project laterally inward slightly beyond said block, said first and second springs at one end thereof extending through said slide between its laterally inboard and outboard faces and making contact respectively with said first and second conductive strips on said laterally outboard face of said slide.

12. A battery holder according to claim 11 wherein:
said switch contacts are cantilevered spring contacts having their respective free ends toward said open end of said guideway.

13. A battery holder according to claim 10 wherein:
said switch contacts are cantilevered spring contacts having their respective free ends toward said open end of said guideway.

* * * * *